United States Patent
Gieras et al.

(10) Patent No.: US 7,777,384 B2
(45) Date of Patent: Aug. 17, 2010

(54) PERMANENT MAGNET DYNAMOELECTRIC MACHINE WITH VARIABLE MAGNETIC FLUX EXCITATION

(75) Inventors: Jacek F. Gieras, Glastonbury, CT (US); Gregory I. Rozman, Rockford, IL (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 391 days.

(21) Appl. No.: 12/061,346

(22) Filed: Apr. 2, 2008

(65) Prior Publication Data

US 2009/0251020 A1 Oct. 8, 2009

(51) Int. Cl.
*H02K 3/493* (2006.01)

(52) U.S. Cl. .............................. 310/180; 310/216.076; 310/190

(58) Field of Classification Search ............ 310/156.01, 310/154.01, 179, 180, 183, 186, 190, 191, 310/209, 210, 214, 224, 216.076, 91, 95, 310/99, 106
See application file for complete search history.

(56) References Cited

U.S. PATENT DOCUMENTS 4,521,709 A * 6/1985 Saint-Michel et al. ....... 310/186
6,809,442 B2 * 10/2004 Kaneko et al. ................ 310/58
2006/0226721 A1* 10/2006 Dooley et al. ............... 310/113

FOREIGN PATENT DOCUMENTS

JP 01133550 A * 5/1989

* cited by examiner

*Primary Examiner*—Quyen Leung
*Assistant Examiner*—Naishadh N Desai
(74) *Attorney, Agent, or Firm*—Stephen G. Mican

(57) ABSTRACT

A permanent magnet (PM) dynamoelectric machine with directly controllable field excitation control comprises: a drive shaft; a PM rotor assembly with multiple PMs arranged around an outer axial periphery of the rotor assembly; a stator assembly comprising a ferromagnetic stator yoke, multiple ferromagnetic stator teeth mounted to the stator yoke with distal ends proximate the outer axial periphery of the rotor assembly separated by an air gap and multiple stator coils mounted between the stator teeth; multiple saturable ferromagnetic shunts, each shunt coupling adjacent distal ends of the stator teeth to shunt air gap magnetic flux $\Phi_g$ generated by the PMs across the air gap through the distal ends of the stator teeth; and multiple saturation control coils, each saturation control coil wrapped about a saturable region of an associated one of the shunts; wherein application of a control current $I_c$ to the control coils at least partially magnetically saturates the shunts to reduce shunting of air gap magnetic flux $\Phi_g$, thereby increasing magnetic flux linkage $\Psi_M$ between the PMs and the stator coils and increasing generated electromagnetic force (EMF) and electromagnetic torque $T_e$ to desired levels upon application of electrical power to the stator coils at lower levels of rotor assembly angular velocity.

17 Claims, 4 Drawing Sheets

PERMANENT MAGNET DYNAMOELECTRIC MACHINE WITH VARIABLE MAGNETIC FLUX EXCITATION

FIELD OF THE INVENTION

The invention relates to permanent magnet (PM) dynamoelectric machines, and more particularly to PM dynamoelectric machines with variable magnetic flux excitation.

BACKGROUND OF THE INVENTION

Control of magnetic excitation flux is not available in standard PM brushless dynamoelectric machines. Such control has only been possible with current vector control techniques or with the addition of a field excitation control winding that receives a control current to weaken or strengthen the primary PM flux. In the case of vector control, a motor controller operates as an inverter system to inject the direct axis (d-axis) current that weakens the PM flux to a desired degree. However, such d-axis current injection to control magnetic flux excitation has certain drawbacks, such as a significant increase in stator winding losses, resulting in excess heat dissipated in the stator winding and irreversible demagnetization of low energy density rotor PMs, such as rotor PMs of the ferrite type.

Machines that have an additional field excitation control winding do not suffer from such adverse effects. Thus, so-called hybrid electric machines with PMs and an additional field excitation winding for direct flux control may be a better choice for industrial motor drives and generators. However, most such hybrid electric machines have relatively complex designs with resulting increases in size, weight and expense.

SUMMARY OF THE INVENTION

The invention generally comprises a permanent magnet (PM) dynamoelectric machine with directly controllable field excitation control, comprising: a drive shaft; a PM rotor assembly with multiple PMs arranged around an outer axial periphery of the rotor assembly; a stator assembly comprising a ferromagnetic stator yoke, multiple ferromagnetic stator teeth mounted to the stator yoke with distal ends proximate the outer axial periphery of the rotor assembly separated by an air gap and multiple stator coils mounted between the stator teeth; multiple saturable ferromagnetic shunts, each shunt coupling adjacent distal ends of the stator teeth to shunt air gap magnetic flux $\Phi_g$ generated by the PMs across the air gap through the distal ends of the stator teeth; and multiple saturation control coils, each saturation control coil wrapped about a saturable region of an associated one of the shunts; wherein application of a control current $I_c$ to the control coils at least partially magnetically saturates the shunts to reduce shunting of air gap magnetic flux $\Phi_g$, thereby increasing magnetic flux linkage $\Psi_M$ between the PMs and the stator coils and increasing generated electromagnetic force (EMF) and electromagnetic torque $T_e$ to desired levels upon application of electrical power to the stator coils at lower levels of rotor assembly angular velocity.

DETAILED DESCRIPTION OF THE INVENTION

Figure 1:
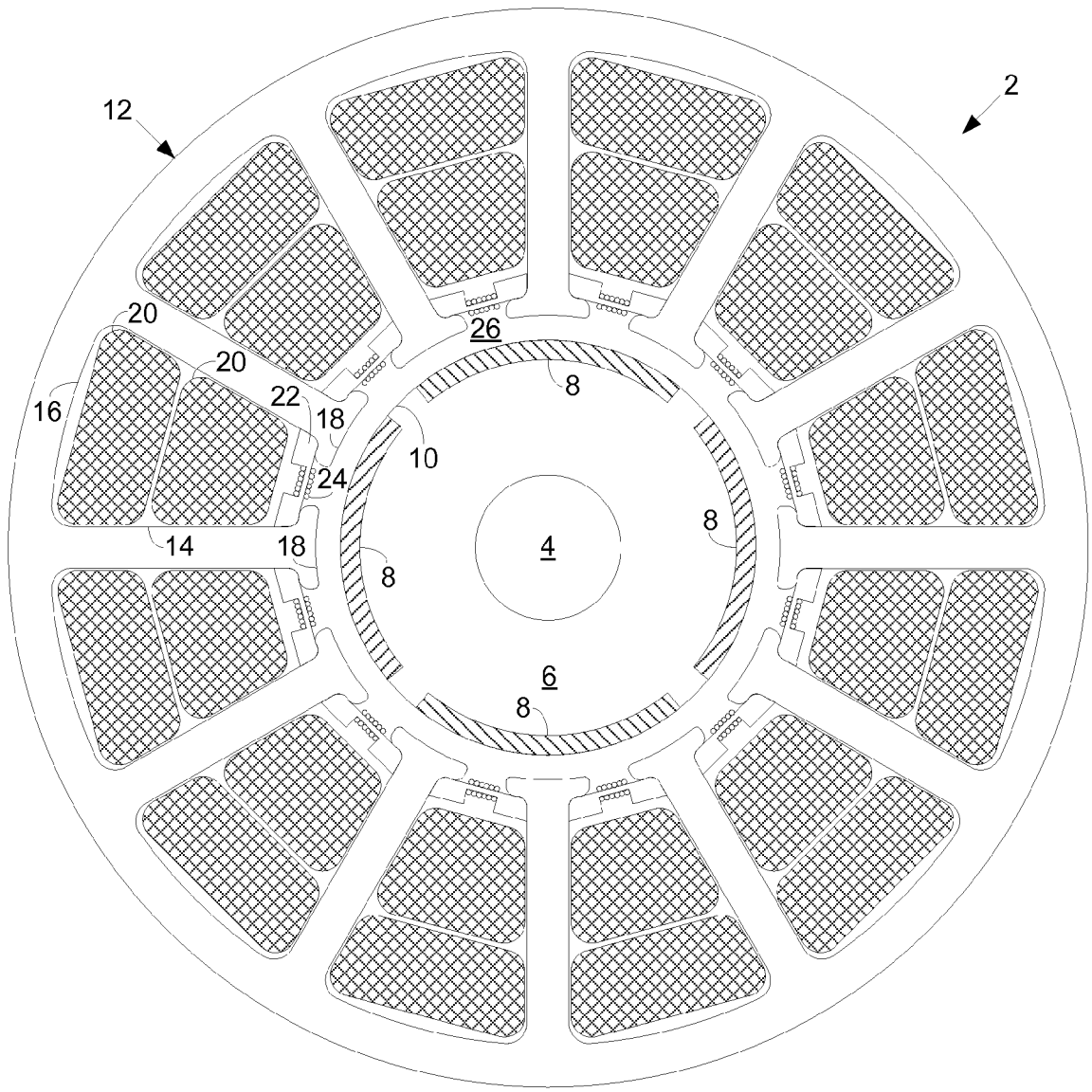
FIG. 1 is a cut-away end view of a permanent magnet (PM) dynamoelectric machine according to one possible embodiment of the invention.

FIG. 1 is a cut-away end view of a permanent magnet (PM) dynamoelectric machine 2 according to one possible embodiment of the invention. The machine 2 has a drive shaft 4 that couples to a PM rotor assembly 6. The PM rotor assembly 6 comprises multiple PMs 8 mounted about its outer annular periphery 10. By way of example only, FIG. 1 shows the PM rotor assembly 6 with four of the PMs 8.

A multiple pole stator assembly 12, typically of the multiphase alternating current type, circumscribes the rotor assembly 6. The stator assembly 12 has multiple ferromagnetic stator teeth 14 coupled to a ferromagnetic stator yoke 16, one stator tooth 14 for each of the poles of the stator assembly 12. A distal end 18 of each stator tooth 14 is proximate the outer annular periphery 10 of the rotor assembly 6. The stator assembly 12 also has multiple stator coils 20 mounted between the stator teeth 14. By way of example only, FIG. 1 shows the stator coils 20 arranged in a multiphase AC two-layer wrap.

The hereinbefore-identified components of the machine 2 describe a typical PM dynamoelectric machine. In operation as an electric motor, a motor drive (not shown) supplies controlled multiphase electrical power to the stator coils 20. The rotating field in the stator assembly 12 causes the rotor assembly 6 to rotate in synchronisation and thereby rotate the drive shaft 4. Fixed excitation flux provided by the PMs 8 in the rotor assembly 6 limit the use of the machine 2. In a PM synchronous motor drive there are two electrical limits: the electrical current and voltage limits, imposed by the constraints of the motor drive, as represented by a maximum direct current (DC) bus voltage $V_{dcmax}$ and a maximum stator coil current $I_{amax}$, that is, $$V = \sqrt{V_d^2 + V_q^2} \leq V_{dc\,max} \tag{1}$$

$$I_a = \sqrt{I_{ad}^2 + I_{aq}^2} \leq I_{a\,max} \tag{2}$$

In equation 1, V is the electrical voltage applied to the stator coils 20, $V_d$ is the d-axis component and $V_q$ is the quadrature axis (q-axis) component. In equation 2, $I_a$ is the electrical current applied to the stator coils 20, $I_{ad}$ is the d-axis component and $I_{aq}$ is the q-axis component. Considering equations 1 and 2 in a steady state with negligible electrical voltage drop, the following equations may express the applied d-axis and q-axis voltages $V_d$ and $V_q$:

$$V_d = -\omega L_q I_{aq} \tag{3}$$

$$V_q = \omega(L_d I_{ad} + \Psi_M) \tag{4}$$

In equations 3 and 4, $\omega = 2\pi f$ is the angular frequency of the stator current, $L_d$ and $L_q$ are inductances of the stator coils 20 in the d-axis and q-axis, respectively, and $\Psi_M$ is the magnetic flux linkage between the PMs 8 and the stator coils 20. The electromagnetic torque $T_e$ of the machine 2 is then expressible as:

$$T_e = \frac{3}{2}p[\Psi_M I_{aq} + (L_d - L_q)I_{ad}I_{aq}] \quad (5)$$

In equation 5, p is the number of pole pairs in the stator assembly 12. For a surface configuration of the PMs 8 in the rotor assembly 6, $L_d=L_q$ and the electromagnetic torque $T_e$ is simply the product of the magnetic flux linkage $\Psi_M$ and the q-axis armature current $L_q$, that is, $$T_e = \frac{3}{2}p\Psi_M I_{aq} \quad (6)$$

The machine 2 is able to regulate the magnetic flux linkage $\Psi_M$ directly by means of multiple magnetically saturable ferromagnetic shunts 22, each generally wedge-shaped shunt 22 inserted and mounted between the corresponding distal ends 18 of adjacent stator teeth 14. Each shunt 22 has an associated saturation control coil 24. The control coils 24 may connect to each other in a series or parallel configuration, although series is preferred, and may receive DC or AC control current for $I_c$ saturation control.

The shunts 22 preferably comprise a laminated ferromagnetic alloy or sintered magnetic powder construction. The shunts 22 with their associated control coils 24 preferably are insertable between the stator teeth 14 of the stator assembly 12 proximate their distal ends 18. The control coils 24 may comprise coils of round, rectangular or foil conductors.

The shunts 22 behave as magnetic flux shunts or diverters for magnetic flux that the rotor assembly 6 generates. When the magnetic reluctance of the shunts 22 is low, such as with no control current passing through their associated control coils 24, the shunts 22 shunt most of an air gap magnetic flux $\Phi_g$ generated by the PMs 8 that passes across an air gap 26 between the outer axial periphery 10 of the rotor assembly 6 and the distal ends 18 of the stator teeth 14. That is, a shunting magnetic flux closely approximates air gap magnetic flux $[\Phi_{sh} \approx \Phi_g]$ with no control current passing through the control coils 24. As a result, the magnetic flux linkage $\Psi_M$ between the PMs 8 and the stator coils 20 is low and the corresponding electromagnetic torque $T_e$ from the machine 2 is low, since it is proportional to the magnetic flux linkage $\Psi_M$, as indicated in equation 6.

When the control current $I_c$ is greater than zero, the shunts 22 partially saturate, their magnetic permeability decreases, their reluctance increases and therefore they only shunt a portion of the air gap flux $\Phi_g$ so that $\Phi_{sh} < \Phi_g$. The magnetic flux linkage $\Psi_M$ between the PMs 8 and the stator coils 20 increases along with electromagnetic force (EMF) induced in the stator coils 20 and electromagnetic torque $T_e$, as indicated in equation 6. Further increase in the control current $I_c$ reduces the reluctance of the shunts 22 still further and their relative magnetic permeability approaches unity. Fully saturated shunts 22 behave as free space so that almost the entire air gap magnetic flux $\Phi_g$ generated by the PMs 8 penetrates through the stator teeth 14 and stator yoke 16 so that the magnetic flux linkage $\Psi_M$ approximates the air gap flux $\Phi_g$. This generates maximum EMF in the stator coils 20 and produces maximum electromagnetic torque $T_e$ from the machine 2, as indicated in equation 6.

Figure 2:
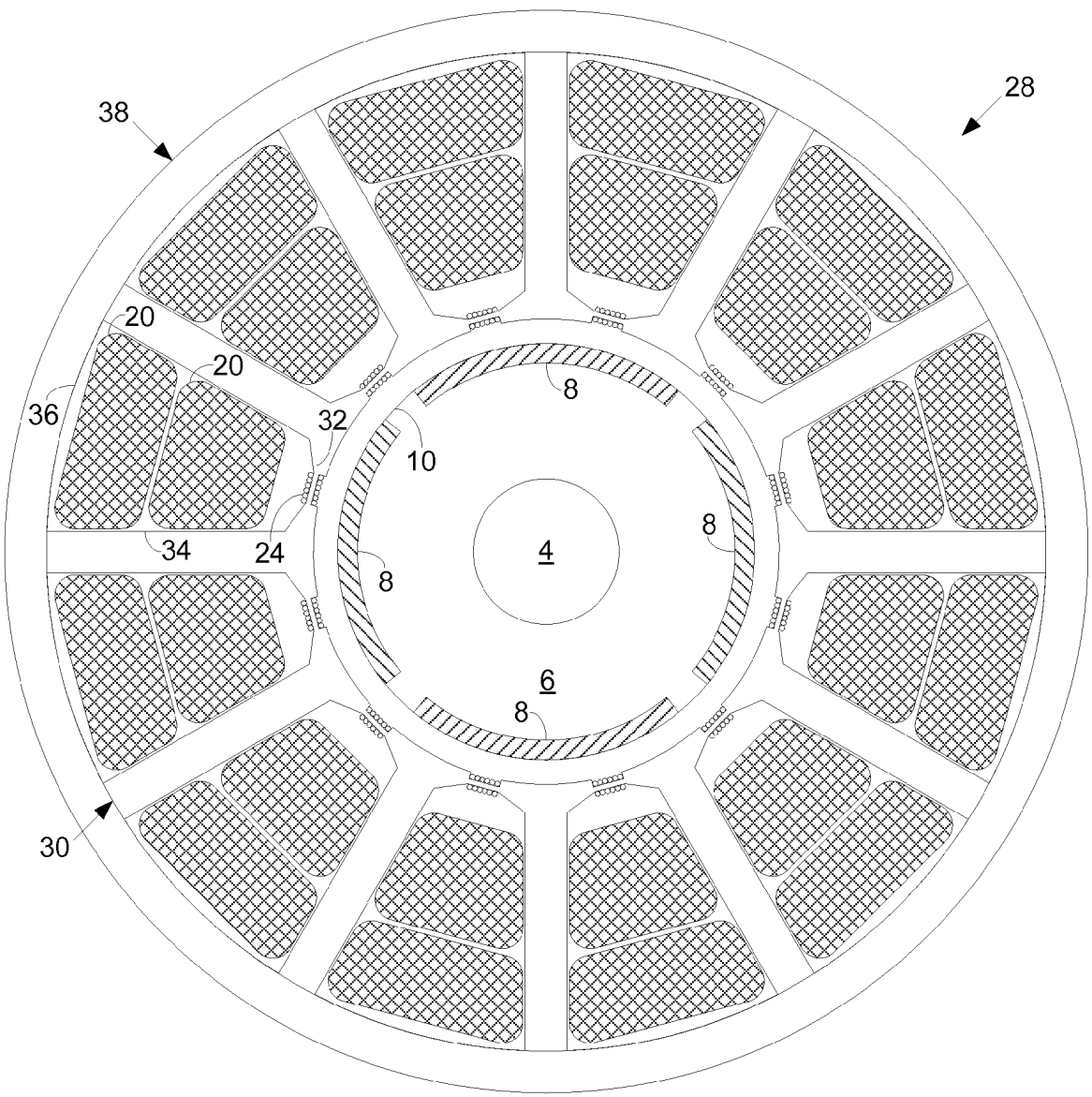
FIG. 2 is a cut-away end view of a PM dynamoelectric machine according to another possible embodiment of the invention.

FIG. 2 is a cut-away end view of a PM dynamoelectric machine 28 according to another possible embodiment of the invention. In this embodiment, a generally star-shaped stator shunt and tooth structure 30 comprises integral saturable ferromagnetic shunts 32 and stator teeth 34. Each shunt 32 is a saturable ferromagnetic region between adjacent stator teeth 34 of the stator shunt and tooth structure. Each shunt 32 has an associated saturation control coil 24. The star-shaped shunt and tooth structure 30 may conveniently comprise a ferromagnetic stamping. The shunt and tooth structure 30 mounts in a stator yoke 36 to form a complete stator assembly 38. It is identical in function and operation to the embodiment of the invention hereinbefore described in connection with FIG. 1.

Figure 3:
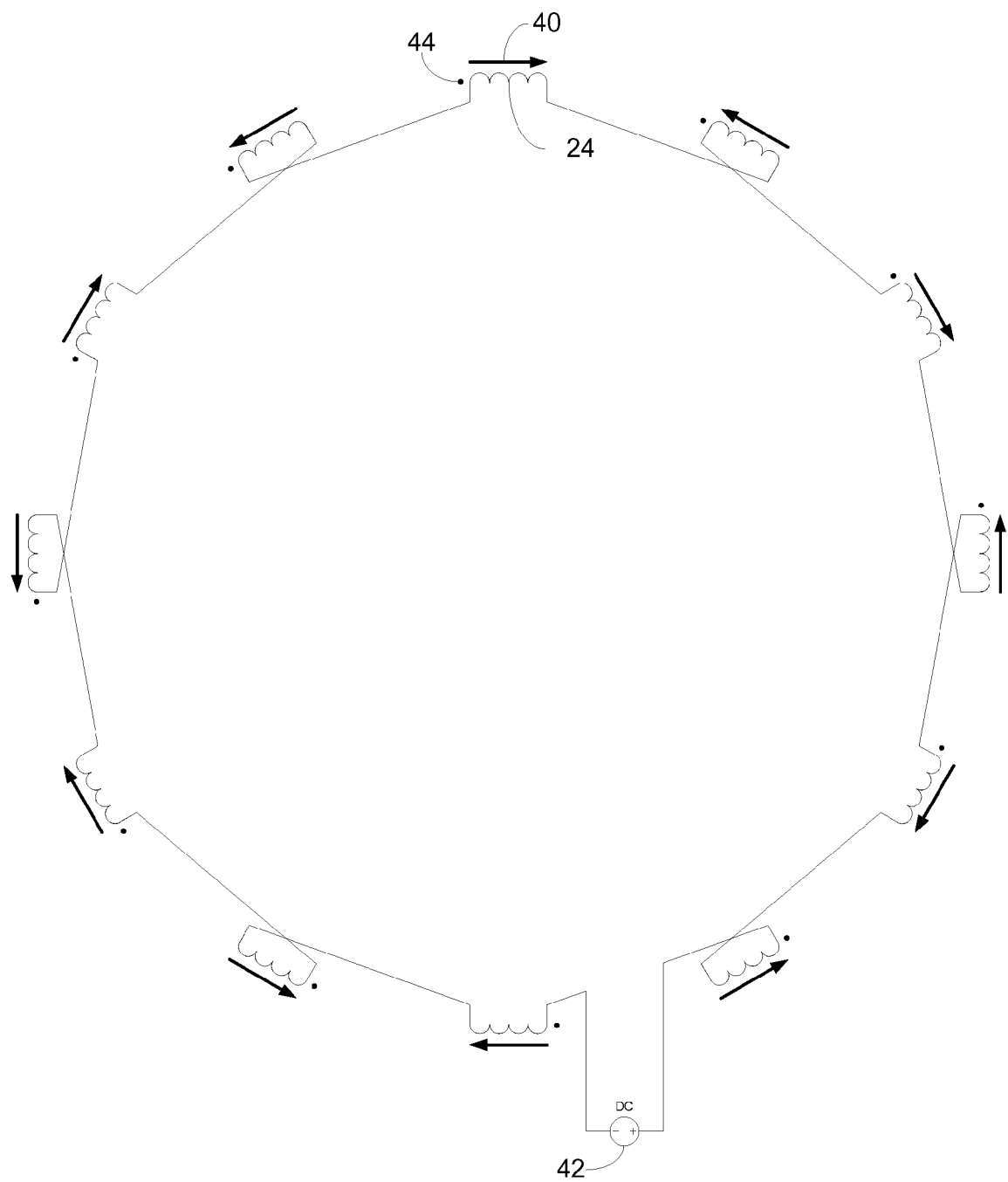
FIG. 3 is a schematic representation of control coils for the PM dynamoelectric machines of FIGS. 1 and 2 that shows their respective shunt magnetic fluxes $\Phi_{sh}$ and control current $I_c$ provided by a control current source.

The magnetic flux that the PMs 8 generate may induce some AC voltage in the control coils 24. If this is objectionable, a special connection of the control coils 24 will cancel this effect. Such a special connection means connecting adjacent control coils 24 to arrange their respective shunt magnetic fluxes $\Phi_{sh}$ in opposition. FIG. 3 is a schematic representation of the control coils 24 with their respective shunt magnetic fluxes $\Phi_{sh}$, represented by arrows 40, with control current $I_c$ provided by a control current source 42. Dots 44 represent the phasing of the control coils 24. This connection may comprise a serial connection of the control coils 24 with adjacent control coils 24 in phase opposition, such as a first side of each control coil 24, represented by its respective dot 44, connecting to a first side of a preceding adjacent control coil 24 in the series connection and a second side of each control coil 24 opposite the first side connecting to second side of the following adjacent control coil 24 in the series connection. This connection is only possible with the use of DC for the source 42 of control current $I_c$.

Figure 4:
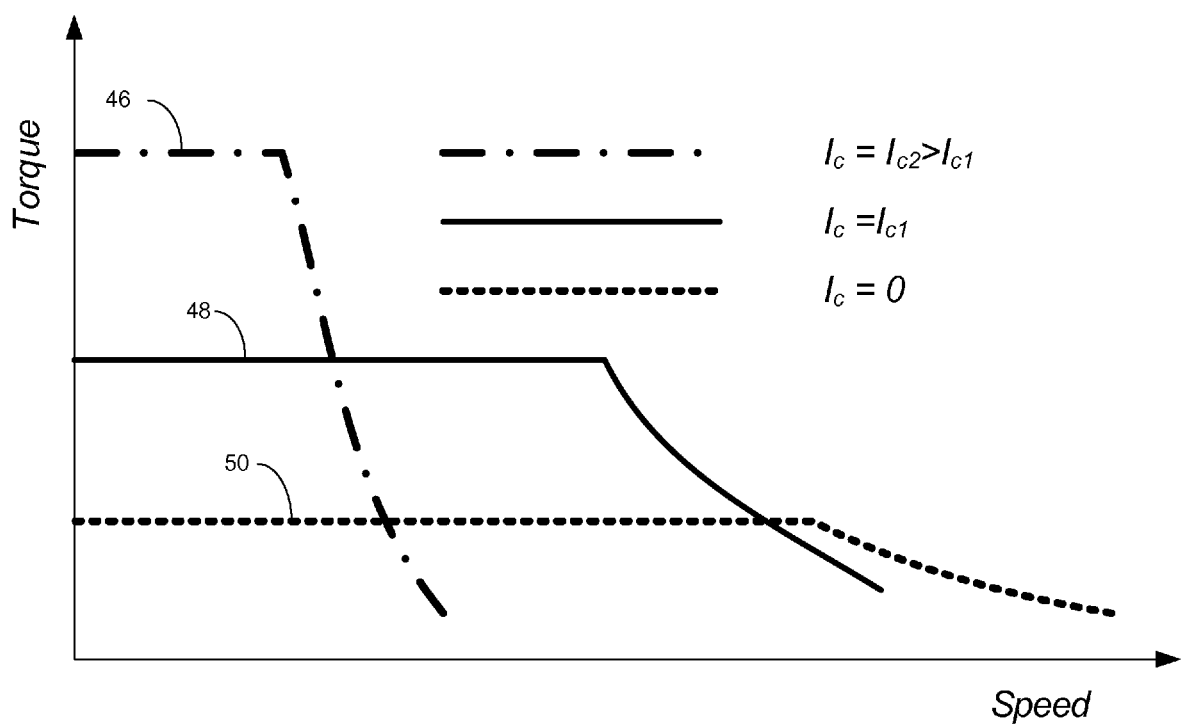
FIG. 4 is a graph of electromagnetic torque $T_e$ as a function of angular velocity of the rotor assembly in the machines shown in FIGS. 1 and 2 for different values of control current $I_c$.

FIG. 4 is a graph of electromagnetic torque $T_e$ as a function of angular velocity of the rotor assembly 6 for different values of control current $I_c$. Line 46 represents the control current $I_c$ at a high level $I_{c2}$ for starting and low speed operations. In this case, generated EMF and electromagnetic torque $T_e$ is at a maximum. Line 48 represents the control current $I_c$ at an intermediate level $I_{c1} < I_{c2}$ for intermediate speed operation. The generated EMF and electromagnetic torque $T_e$ are at a lower intermediate level. Line 50 represents the control current $I_c$ at zero level for high speed operation. The generated EMF and electromagnetic torque $T_e$ are at a lowest level.

The described embodiments of the invention are only some illustrative implementations of the invention wherein changes and substitutions of the various parts and arrangement thereof are within the scope of the invention as set forth in the attached claims.

The claimed invention is:

1. A permanent magnet (PM) dynamoelectric machine with directly controllable field excitation control comprising:
   a drive shaft;
   a PM rotor assembly with multiple PMs arranged around an outer axial periphery of the rotor assembly;
   a stator assembly comprising a ferromagnetic stator yoke, multiple ferromagnetic stator teeth mounted to the stator yoke with distal ends proximate the outer axial periphery of the rotor assembly separated by an air gap and multiple stator coils mounted between the stator teeth;
   multiple saturable ferromagnetic shunts, each shunt coupling adjacent distal ends of the stator teeth to shunt air gap magnetic flux $\Phi_g$ generated by the PMs across the air gap through the distal ends of the stator teeth; and
   multiple saturation control coils, each saturation control coil wrapped about a saturable region of an associated one of the shunts;
   wherein application of a control current $I_c$ to the control coils at least partially magnetically saturates the shunts to reduce shunting of air gap magnetic flux $\Phi_g$, thereby increasing magnetic flux linkage $\Psi_M$ between the PMs and the stator coils and increasing generated electromagnetic force (EMF) and electromagnetic torque $T_e$ to desired levels upon application of electrical power to the stator coils at lower levels of rotor assembly angular velocity.

2. The machine of claim 1, wherein each shunt comprises a generally wedge-shaped shunt that mounts between the distal ends of adjacent ones of the stator teeth.

3. The machine of claim 1, wherein each shunt has a laminated ferromagnetic alloy construction.

4. The machine of claim 1, wherein each shunt comprises a sintered magnetic powder construction.

5. The machine of claim 1, wherein each control coil comprises a coil of a round conductor wrapped around its associated shunt.

6. The machine of claim 1, wherein each control coil comprises a coil of a rectangular conductor wrapped around its associated shunt.

7. The machine of claim 1, wherein each control coil comprises a coil of a foil conductor wrapped around its associated shunt.

8. The machine of claim 1, further comprising a generally star-shaped stator tooth and shunt structure mounted within the stator yoke that forms the stator teeth and shunts.

9. The machine of claim 8, wherein the stator tooth and shunt structure comprises a ferromagnetic stamping.

10. The machine of claim 8, wherein each shunt is an integral saturable ferromagnetic region between stator teeth of the stator tooth and shunt structure.

11. The machine of claim 1, wherein the control coils connect to each other in series.

12. The machine of claim 11, wherein the control current $I_c$ is alternating current (AC).

13. The machine of claim 11, wherein the control current $I_c$ is direct current (DC).

14. The machine of claim 13, wherein adjacent ones of the control coils attach to each other to arrange their respective shunting magnetic fluxes $\Phi_{sh}$ in opposition.

15. The machine of claim 14, wherein a first side of each control coil connects to a first side of a preceding adjacent control coil in the series connection and a second side of each control coil opposite the first side connects to second side of the following adjacent control coil in the series connection.

16. A permanent magnet (PM) electric motor with directly controllable field excitation control comprising:
a drive shaft;
a PM rotor assembly with multiple PMs arranged around an outer axial periphery of the rotor assembly;
a stator assembly comprising a ferromagnetic stator yoke, multiple ferromagnetic stator teeth mounted to the stator yoke with distal ends proximate the outer axial periphery of the rotor assembly separated by an air gap and multiple stator coils mounted between the stator teeth;
multiple generally wedge-shaped saturable ferromagnetic shunts, each shunt mounted between adjacent distal ends of the stator teeth to shunt air gap magnetic flux $\Phi_g$ generated by the PMs across the air gap through the distal ends of the stator teeth; and
multiple saturation control coils, each saturation control coil wrapped about a saturable region of an associated one of the shunts;
wherein application of a control current $I_c$ to the control coils at least partially magnetically saturates the shunts to reduce shunting of air gap magnetic flux $\Phi_g$, thereby increasing magnetic flux linkage $\Psi_M$ between the PMs and the stator coils and increasing generated electromagnetic force (EMF) and electromagnetic torque $T_e$ to desired levels upon application of electrical power to the stator coils at lower levels of rotor assembly angular velocity.

17. A permanent magnet (PM) electric motor with directly controllable field excitation control comprising:
a drive shaft;
a PM rotor assembly with multiple PMs arranged around an outer axial periphery of the rotor assembly;
a stator assembly comprising a ferromagnetic stator yoke, a generally star-shaped stator tooth and shunt structure mounted within the stator yoke, the stator tooth and shunt structure forming multiple ferromagnetic stator teeth mounted to the stator yoke with distal ends proximate the outer axial periphery of the rotor assembly separated by an air gap and multiple stator coils mounted between the stator teeth and integral saturable ferromagnetic regions between stator teeth of the stator tooth and shunt structure that serve as multiple saturable ferromagnetic shunts, each shunt located between adjacent distal ends of the stator teeth to shunt air gap magnetic flux $\Phi_g$ generated by the PMs across the air gap through the distal ends of the stator teeth; and
multiple saturation control coils, each saturation control coil wrapped about a saturable region of an associated one of the shunts;
wherein application of a control current $I_c$ to the control coils at least partially magnetically saturates the shunts to reduce shunting of air gap magnetic flux $\Phi_g$, thereby increasing magnetic flux linkage $\Psi_M$ between the PMs and the stator coils and increasing generated electromagnetic force (EMF) and electromagnetic torque $T_e$ to desired levels upon application of electrical power to the stator coils at lower levels of rotor assembly angular velocity.

* * * * *